United States Patent
Carson, Jr. et al.

(10) Patent No.: US 10,856,474 B2
(45) Date of Patent: Dec. 8, 2020

(54) STUMP CUTTER TOOTH ASSEMBLY

(71) Applicants: Kennametal Inc., Latrobe, PA (US);
Vermeer Manufacturing Company, Pella, IA (US)

(72) Inventors: Duane E. Carson, Jr., Hollidaysburg, PA (US); Keith L. Roozeboom, Pella, IA (US); Clint A. Weinberg, Pella, IA (US); Robbie D. Bloom, Hooversville, PA (US); Matthew R. Disselkoen, Pella, IA (US); Claudio Carrafiello Verzilli, Pella, IA (US)

(73) Assignees: Kennametal Inc., Latrobe, PA (US);
Vermeer Manufacturing Company, Pella, IA (US)

( * ) Notice: Subject to any disclaimer, the term of this patent is extended or adjusted under 35 U.S.C. 154(b) by 202 days.

(21) Appl. No.: 16/033,325

(22) Filed: Jul. 12, 2018

(65) Prior Publication Data
US 2020/0015434 A1 Jan. 16, 2020

(51) Int. Cl.
*A01G 23/06* (2006.01)

(52) U.S. Cl.
CPC .................. *A01G 23/067* (2013.01)

(58) Field of Classification Search
CPC ........ A01G 23/06; A01G 23/067; B23C 5/20; B23C 5/205; B23C 5/207; B23C 2200/045; B23C 2200/161; B23C 2200/283; B23C 2200/286; B27G 13/00; B27G 13/02; B27G 13/04; B27G 13/08; B27G 13/10; B02C 18/18
See application file for complete search history.

(56) References Cited

U.S. PATENT DOCUMENTS

| 2,121,044 A | 6/1938 | Noble |
| 2,736,352 A | 2/1956 | Wright |
| 2,992,664 A | 7/1961 | Shano |
| 3,642,214 A | 2/1972 | Blackwell |
| 3,797,544 A | 3/1974 | Ver Ploeg |
| 3,845,796 A | 11/1974 | Moore |
| 3,935,887 A | 2/1976 | Van Zante |

(Continued)

FOREIGN PATENT DOCUMENTS

| EP | 2896290 A2 | 7/2015 |
| EP | 2777385 B1 | 5/2016 |

OTHER PUBLICATIONS

Feb. 26, 2019 Foreign OA P18-06353-BR-RD.

(Continued)

*Primary Examiner* — Matthew Katcoff
(74) *Attorney, Agent, or Firm* — Kennametal Inc.

(57) ABSTRACT

A stump cutter tooth assembly includes a stump cutter tooth held by a pocket member that includes an arcuate shoulder having one or more tabs. A stump cutter tooth is adapted to be mounted on the pocket member. The stump cutter tooth includes a tooth body having one or more recesses and an arcuate outer surface. The arcuate outer surface of the stump cutter tooth is adapted to abut against the arcuate shoulder of the pocket member to prevent unwanted movement of the stump cutter tooth relative to the pocket member during the cutting operation. The one or more recesses of the stump cutter tooth cooperate with the one or more tabs of the pocket member to provide an anti-rotation and locating feature.

16 Claims, 17 Drawing Sheets

(56) References Cited

U.S. PATENT DOCUMENTS

| | | |
|---|---|---|
| 4,193,638 A | 3/1980 | Heckenhauer |
| 4,627,665 A | 12/1986 | Ewing |
| 4,753,934 A | 6/1988 | Nickl |
| 4,932,447 A | 6/1990 | Morin |
| 4,974,649 A | 12/1990 | Manning |
| 4,998,574 A | 3/1991 | Beach |
| 5,058,477 A | 10/1991 | MacLennan |
| 5,100,070 A | 3/1992 | Montgomery, Sr. |
| 5,113,919 A | 5/1992 | MacLennan |
| 5,205,199 A | 4/1993 | MacLennan |
| 5,211,212 A | 5/1993 | Carlson |
| 5,269,355 A | 12/1993 | Bowen |
| 5,303,752 A | 4/1994 | MacLennan |
| 5,481,962 A | 1/1996 | MacLennan |
| 5,497,815 A | 3/1996 | Bowing |
| 5,623,978 A | 4/1997 | Clemenson |
| 5,644,965 A | 7/1997 | MacLennan |
| 5,743,314 A | 4/1998 | Puch |
| 5,819,827 A | 10/1998 | Leonardi |
| 5,996,657 A | 12/1999 | Riesselman |
| 6,024,143 A | 2/2000 | Ritchey |
| 6,138,725 A | 10/2000 | Leonardi |
| 6,176,445 B1 | 1/2001 | Shinn |
| 6,382,277 B1 | 5/2002 | Paumier |
| 6,536,322 B1 | 3/2003 | Butler |
| 6,546,977 B1 | 4/2003 | Monyak |
| 6,834,692 B2 * | 12/2004 | Lindsay .................. B23C 5/207 144/208.8 |
| 6,848,485 B1 | 2/2005 | Paumier |
| 7,216,682 B1 * | 5/2007 | Bennington ......... A01G 23/067 144/228 |
| 7,484,541 B2 | 2/2009 | Green |
| 7,938,350 B2 | 5/2011 | Doppstadt et al. |
| 8,020,591 B2 | 9/2011 | Kappel et al. |
| 8,408,258 B2 | 4/2013 | Leonardi et al. |
| 8,469,456 B2 | 6/2013 | Buhr et al. |
| 8,522,843 B2 | 9/2013 | Kappel et al. |
| 8,540,033 B2 | 9/2013 | Stanley et al. |
| 8,672,001 B2 | 3/2014 | Leonardi et al. |
| 8,857,748 B2 | 10/2014 | Carson, Jr. et al. |
| D742,421 S | 11/2015 | Nelson |
| 9,216,463 B2 * | 12/2015 | Hecht ................... B23B 29/043 |
| 9,284,698 B2 | 3/2016 | Buhr et al. |
| 9,585,313 B2 | 3/2017 | Kappel et al. |
| D791,195 S | 7/2017 | Stanley et al. |
| D795,931 S | 8/2017 | Stanley et al. |
| 9,803,325 B2 | 10/2017 | Buhr et al. |
| 10,118,178 B2 * | 11/2018 | Doppstadt ............... B02C 18/18 |
| 10,327,394 B2 * | 6/2019 | Willibald .............. B02C 18/145 |
| 2002/0013058 A1 | 1/2002 | Tang |
| 2002/0125353 A1 | 9/2002 | Bardos |
| 2003/0188802 A1 | 10/2003 | Green |
| 2003/0209285 A1 | 11/2003 | Ziehm |
| 2004/0056129 A1 * | 3/2004 | Doppstadt ............... B02C 18/18 241/194 |
| 2004/0172828 A1 | 9/2004 | Kammerer |
| 2005/0087262 A1 | 4/2005 | Clemenson |
| 2005/0156459 A1 | 7/2005 | Roozeboom |
| 2005/0166997 A1 | 8/2005 | Shinn |
| 2005/0173023 A1 | 8/2005 | Cao |
| 2005/0217756 A1 | 10/2005 | Cao |
| 2006/0102247 A1 | 5/2006 | Green |
| 2007/0125445 A1 | 6/2007 | Watts |
| 2007/0151430 A1 | 7/2007 | MacLennan |
| 2007/0181725 A1 | 8/2007 | Edwards |
| 2007/0193428 A1 | 8/2007 | MacLennan et al. |
| 2008/0099103 A1 | 5/2008 | Leonardi |
| 2008/0142116 A1 | 6/2008 | Green |
| 2008/0142120 A1 | 6/2008 | Green |
| 2008/0149224 A1 | 6/2008 | Kappel |
| 2008/0245440 A1 | 10/2008 | Paumier |
| 2010/0043922 A1 | 2/2010 | Leonardi |
| 2012/0001003 A1 | 1/2012 | Davis |
| 2012/0012229 A1 | 1/2012 | Kappel et al. |
| 2012/0024425 A1 | 2/2012 | Leonardi |
| 2014/0027017 A1 | 1/2014 | Green |
| 2014/0196818 A1 | 7/2014 | Weinberg |
| 2014/0318870 A1 | 10/2014 | George |
| 2014/0318871 A1 | 10/2014 | Paros |
| 2014/0318872 A1 | 10/2014 | Paros |
| 2014/0319261 A1 | 10/2014 | Paros |
| 2014/0319897 A1 | 10/2014 | Paros |
| 2014/0338791 A1 | 11/2014 | Green |
| 2015/0083275 A1 | 3/2015 | Paumier |
| 2017/0105365 A1 | 4/2017 | Holly et al. |
| 2019/0223368 A1 * | 7/2019 | Seppi ..................... B02C 18/18 |

OTHER PUBLICATIONS

Jan. 18, 2019 Foreign OA P18-06353-RU-RD [2].
Jan. 18, 2019 Foreign OA P18-06353-RU-RD.
Jan. 15, 2019 Foreign OA P18-06353-AU-RD.
Oct. 29, 2019 International Search Report P18-06331-WO-PCT.
Oct. 8, 2019 Foreign OA P18-06353-BR-RD.
Jul. 9, 2019 Notice of Allowance P18-06353-RU-RD.
Jun. 28, 2019 Notice of Allowance P18-06353-RU-RD[2].
May 15, 2019 Notice of Allowance P18-06353-CN-RD.
Jul. 2, 2019 Foreign OA P18-06353-BR-RD.

* cited by examiner

STUMP CUTTER TOOTH ASSEMBLY

FIELD OF THE INVENTION

The invention pertains generally to a cutter tooth that has a hard insert or cutting insert at the axial forward end, wherein the cutter tooth is useful to impinge and/or disintegrate a piece of material such as, for example, wood or earth strata. More specifically, the invention pertains to such a cutter tooth (such as, for example, an indexable stump cutter tooth), that when used in a stump cutter machine allows the stump cutter machine to experience an increase in operational efficiency (i.e., a reduction in operational downtime), as compared to a stump cutter machine that used earlier stump cutter teeth.

BACKGROUND OF THE INVENTION

As is generally known, there have been machines used to impinge and/or disintegrate materials, such as, for example, wood and/or earth strata. These machines have included, without limitation, machines used to cut or disintegrate wood or brush, such as, for example, land clearing machines, tub or horizontal grinders, stump cutters, and force feed grinders.

In the case of stump cutter machines (i.e., stump cutter assemblies), the stump cutter machine is positioned near the stump, and then the wheel is driven (or rotated) and then moved in a radial sweeping motion whereby the moving stump cutter teeth impinge the stump. After having made a number of cuts or passes into the stump, the result is that the stump has been disintegrated below the surface of the ground. For example, FIG. 19 shows a conventional stump cutter assembly (generally designated as 400) that is in engagement with a stump (designated as "STUMP"). The stump cutter stump cutter tooth assemblies (e.g., stump cutter teeth and pockets) shown and described in this patent application can be used with the cutter assembly 400. This particular stump cutter assembly (or stump cutter machine) is a Vermeer SC352 stump cutter made and sold by Vermeer Mfg. Co., 1210 Vermeer Road East, Pella, Iowa 50219. However, there is no intention to limit or restrict the scope of the invention to any specific type or kind of stump cutter assembly.

Still referring to FIG. 19, the stump cutter assembly 400 has an arm (or frame) 422 with a distal end and to which is operatively rotatably attached a driven cutting wheel 426 about a first axis A-A. The driven cutting wheel 426 has a circumferential (or peripheral) edge 428 and a radial outer portion that has its radial outer termination at the circumferential edge. The driven cutting wheel 426 has opposite side surfaces that comprise a first side surface 429A and a second side surface 429B. A plurality of stump cutter tooth assemblies is affixed to the cutting wheel 426 in the vicinity of the peripheral edge 428 of the driven wheel. Each stump cutter tooth assembly comprises a stump cutter tooth and a pocket member.

FIG. 20 illustrates a conventional stump cutter tooth assembly comprising a stump cutter tooth 500 and a pocket member 560. The stump cutter tooth 500 has a central longitudinal axis F-F, as shown in FIG. 21. The stump cutter tooth 500 has an elongated cutter tooth body 502 with an axial forward end 504 and an axial rearward end 506. The cutter tooth body 502 has a head portion 508 adjacent to the axial forward end 504, and a shank portion 510 adjacent to the axial rearward end 506. The head portion 508 presents a pair of opposite base surfaces 512 and 514, each base surface having a generally vertical and a generally horizontal (as viewed in FIG. 21) surface. These base surfaces 512, 514 are disposed about 180 degrees apart. The shank portion 510 has a threaded portion 520.

The head portion 508 further defines a seat surface 544 which is configured to abut against the base surfaces 573A, 573B when the stump cutter tooth 500 is mounted to the pocket member 560. Flat stop surface 516 is intended to abut against the shoulder 590 in any one of the embodiments of the pocket when the stump cutter tooth 500 is retained by the pocket member 560. The head portion 508 defines another flat stop surface disposed 180 degrees from the flat stop surface 516.

The stump cutter tooth 500 further includes a pair of hard inserts 524A and 524B. Each one of the hard inserts (524A, 524B) has a generally arcuate flank surface (526A, 526B) a generally planar top rake surface (528A, 528B) and a generally planar inner flank surface (530A, 530B). Cutting edges 532A and 532B are at the intersections of the flank surfaces 526A and 526B and the top surfaces 528A and 528B, respectively. Each one of the cutting edges (532A, 532B) has a generally arcuate shape. The hard inserts 524A and 524B are spaced apart a small distance, which means that the inner flank surfaces of the hard inserts are spaced a small distance from one another.

Each one of the hard inserts (524A, 524B) is typically made from a hard material such as, for example, cemented (cobalt) tungsten carbide. Brazing is the preferred way to affix the hard inserts to the elongated body.

It should be appreciated that the hard inserts may also be affixed to the cutter tooth body via an adhesive such as, for example, an epoxy. Further, it is contemplated that the hard inserts may be affixed to the cutter tooth body via mechanical means such as, for example, a clamp or bolt or the like that mechanically acts on the hard insert.

As known in the art, there are three different styles of pocket members (i.e., a straight pocket, a cross-over pocket and an offset pocket), as shown and described in U.S. Pat. No. 9,585,313, the entire contents of which is incorporated herein by reference. Each one of these styles or kinds of pocket members includes an extension (or radial outer portion that is reduced in both width and thickness as compared to the radial inner portion of the pocket member) that contains a bore.

For example, FIG. 22 shows an offset pocket member, generally designated as 560. The offset pocket 560 includes a body 562 that has a radial inner end 564 and a radial outer end 566. The pocket body 562 also has an outer side surface 568 and an inner side surface 570. When the pocket 560 is securely affixed to the driven cutting wheel 426, the inner side surface 570 is adjacent to and pressed against a selected one of the first or second side surfaces (429A, 429B) of the wheel 426.

The body 562 has an enlarged (or base) portion 572 adjacent to the radial inner end 564 thereof. The pocket body 562 further includes an angled (reduced dimension) portion 582 that extends from and is integral with the base portion 572. The base portion 572 has an enlarged thickness and width as compared to the rest of the cutter body (i.e., the reduced portion 582). The base portion 572 contains a pair of bores 574 and 576 therein. Typically, at least one of the bores 574 and 576 is a threaded bore, for example, the bore 576 is a threaded bore.

The offset pocket 560 has opposite edges 592A and 592B. The angled portion 582 contains a bore 586 that passes between the opposite edges 592A and 592B. There are opposite shoulders (or abutment surfaces) 590A and 590B at a location near where the pocket body 562 transitions between the base portion and the reduced portion. The pocket body 562 defines another shoulder 590B (not shown) disposed 180 degrees from the shoulder 590A. Base surfaces 573A and 573B are spaced apart defining a width of the radial outward end 566.

Referring back to FIG. 20, the stump cutter tooth 500 is attached to the pocket member 560 by positioning the shank portion 510 of the stump cutter tooth 500 in the bore 586 and, at least for one specific embodiment of the stump cutter tooth, tightening a nut onto the threaded portion of the shank to secure the stump cutter tooth to the pocket member. When properly mounted on the pocket member 560, the seating surface 544 abuts against the selected one of the base surfaces 573 (573A or 573B), and the selected one of the flat stop surfaces 516 (FIG. 18) of the stump cutter tooth 500 engages a selected one of the shoulders 590A and 590B to help keep the stump cutter tooth 500 from rotating during the stump cutting operation.

There are many other examples of solutions in the prior art for preventing unwanted rotation of a cutting tooth around a single mounting bolt. Unfortunately, rotation of the stump cutter tooth 500 in the pocket member 560 may take place during the stump cutting operation. This can be due to manufacturing issues of the stump cutter tooth 500 and/or pocket member 560. It can also be due to over use and/or excess wear of the tooth and/or pocket. When the outside corners of the stump cutter tooth 500 near the mounting surface are too rounded through manufacturing and/or operational wear, it reduces the width of the flat stop surfaces 516 laterally on the stump cutter tooth 500, allowing it to slip past the shoulder 590A and 590B on the pocket member 560, resulting in poor performance, premature wear of the pocket/tooth, and/or catastrophic failure of the system. In addition to corner wear, over use of the tooth can lead to the wearing away of the ledge on the tooth body all together, leaving the tooth with nothing to engage the pocket.

In view of the foregoing, it would be highly desirable to provide an improved stump cutter tooth assembly that eliminates the issues associated with properly seating the stump cutter tooth due to the corners rounding on the tooth, while preventing unwanted rotation of the stump cutter tooth in the pocket member during a cutting operation.

SUMMARY OF THE INVENTION

The problem associated with unwanted movement of the stump cutter tooth relative to the pocket member during cutting operations is solved by having a non-planar stop surface formed on the cutter tooth body that is adapted to abut against a non-planar shoulder that is formed in the pocket member. In addition, the problem associated with unwanted movement of the stump cutter tooth in the pocket member during cutting operations is solved by having the non-planar stop surface formed with a plurality of surfaces, including one or more recesses formed in the tooth body that cooperate with one or more tabs formed in the non-planar shoulder to define an anti-rotation, even if the stump cutter tooth is worn past it's designed life. Further, the one or more non-planar surfaces provide a locating feature to properly locate the stump cutter tooth in the pocket member. In some examples, the mating features are at least partially ornamental in nature and feature non-functional elements.

In accordance with an aspect of the invention, a stump cutter tooth assembly comprises a pocket member that includes an arcuate shoulder. A stump cutter tooth is adapted to be mounted on the pocket member. The stump cutter tooth includes a tooth body having a seating surface and an arcuate outer surface. At least one hard insert is mounted on the seating surface of the tooth body. At least one hard insert has a primary cutting edge at an intersection between a top surface and an outer flank surface. The arcuate shoulder of the pocket member is adapted to abut against the arcuate outer surface of the stump cutter tooth to prevent unwanted movement of the stump cutter tooth relative to the pocket member during the cutting operation.

In another aspect, a stump cutting tooth includes a tooth body having a seating surface and an arcuate outer surface. At least one hard insert is mounted on the seating surface of the tooth body. At least one hard insert has a primary cutting edge at an intersection between a top surface and an outer flank surface. The arcuate outer surface of the stump cutter tooth is adapted to abut against an arcuate shoulder of a pocket member to prevent unwanted movement of the stump cutter tooth relative to the pocket member during the cutting operation.

In yet another form thereof, the invention is a cutting insert has a top surface, an outer flank surface, an inner flank surface, and a primary cutting edge formed at an intersection between the top surface and the outer flank surface. The hard insert has a boomerang shape.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
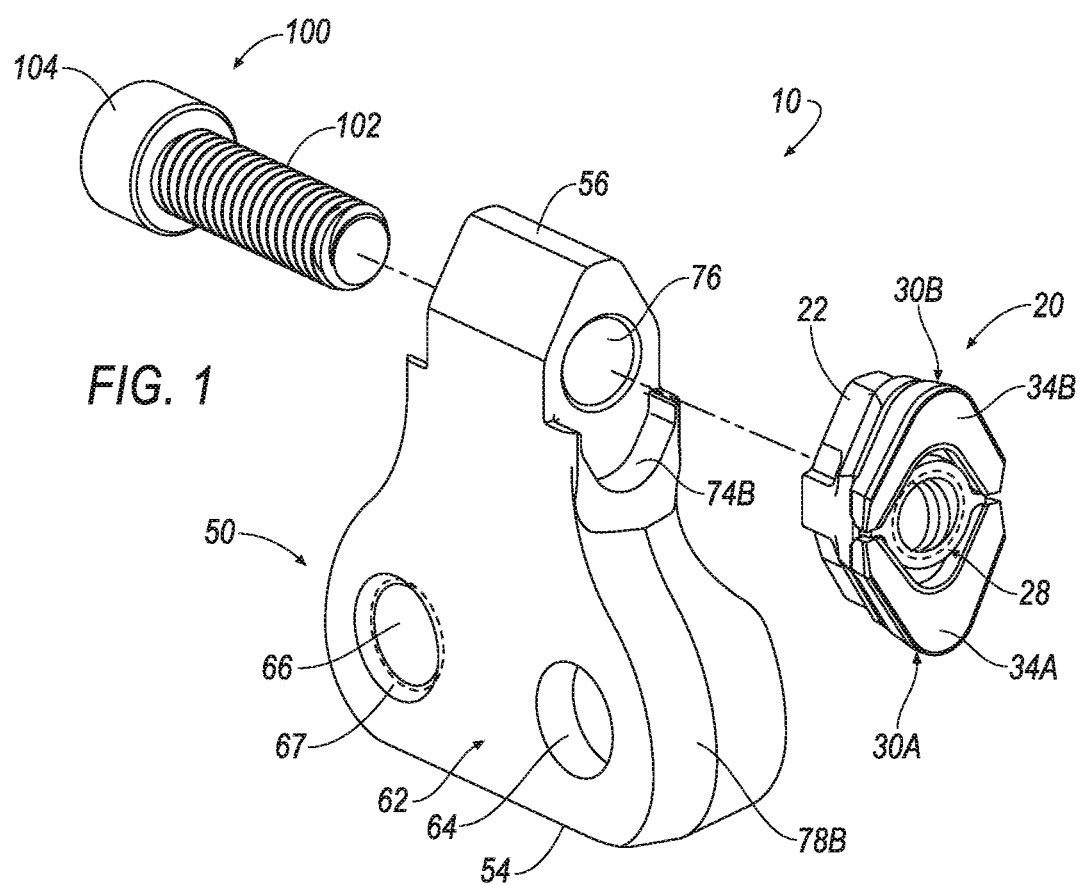
FIG. 1 is an exploded, isometric view of a stump cutter tooth assembly according to an embodiment of the invention.
Figure 2:
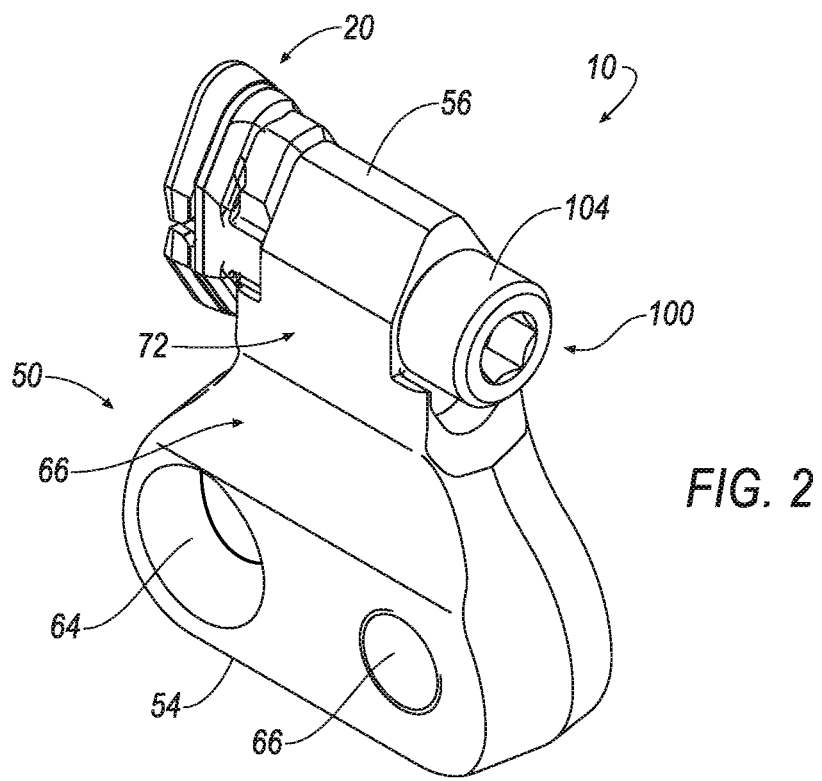
FIG. 2 is an isometric view of the stump cutter tooth assembly of FIG. 1 when assembled.

Referring to the drawings, FIGS. 1-5 show a stump cutter tooth assembly, generally designated as 10, according to an embodiment of the invention. In general, the stump cutter tooth assembly 10 comprises a stump cutter tooth, generally designated as 20, a pocket member, generally designated as 50, and a fastener, generally designated as 100, such as a bolt, and the like, for affixing the stump cutter tooth in the pocket member 50.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "arcuate" is defined as a surface that is bent, arched or curved like a bow, and can comprise a continuously bent, arched or curved surface, or can comprise of a plurality of planar surfaces that together form a bent, arched or curved surface.

Referring now to FIGS. 6-10, the stump cutter tooth 20 has a central longitudinal axis B-B. The stump cutter tooth 20 has a cutter tooth body 22 presents a pair of opposite seating surfaces 24A and 24B. Each seating surface 24A and 24B has a generally vertical and a generally horizontal surface (as viewed in FIG. 6). These seating surfaces 24A, 24B are disposed about 180 degrees apart from each other.

The body 22 further defines an arcuate stop surface 26A that abuts against the arcuate shoulder 74A and 74B of the pocket member 50 (see FIG. 16) when the stump cutter tooth 20 is properly mounted in the pocket member 50 by the fastener 100. Arcuate shoulder 74B is not visible in FIG. 16, but arcuate shoulder 74B is the same shape as arcuate shoulder 74A in all embodiments. The body 22 defines another arcuate stop surface 26B disposed 180 degrees from the arcuate stop surface 26A. It will be appreciated that all embodiments of the stump cutter tooth include the arcuate stop surfaces 26A and 26B, and all embodiments of the pocket member include the arcuate shoulders 74A and 74B. The arcuate shoulder 74A and 74B cooperates with a respective arcuate stop surface 26A and 26B to help maintain the proper orientation and prevent unwanted movement of the stump cutter tooth 20 relative to the pocket member 50 during the cutting operation, even if the stump cutter tooth 20 has become worn.

Figure 8:
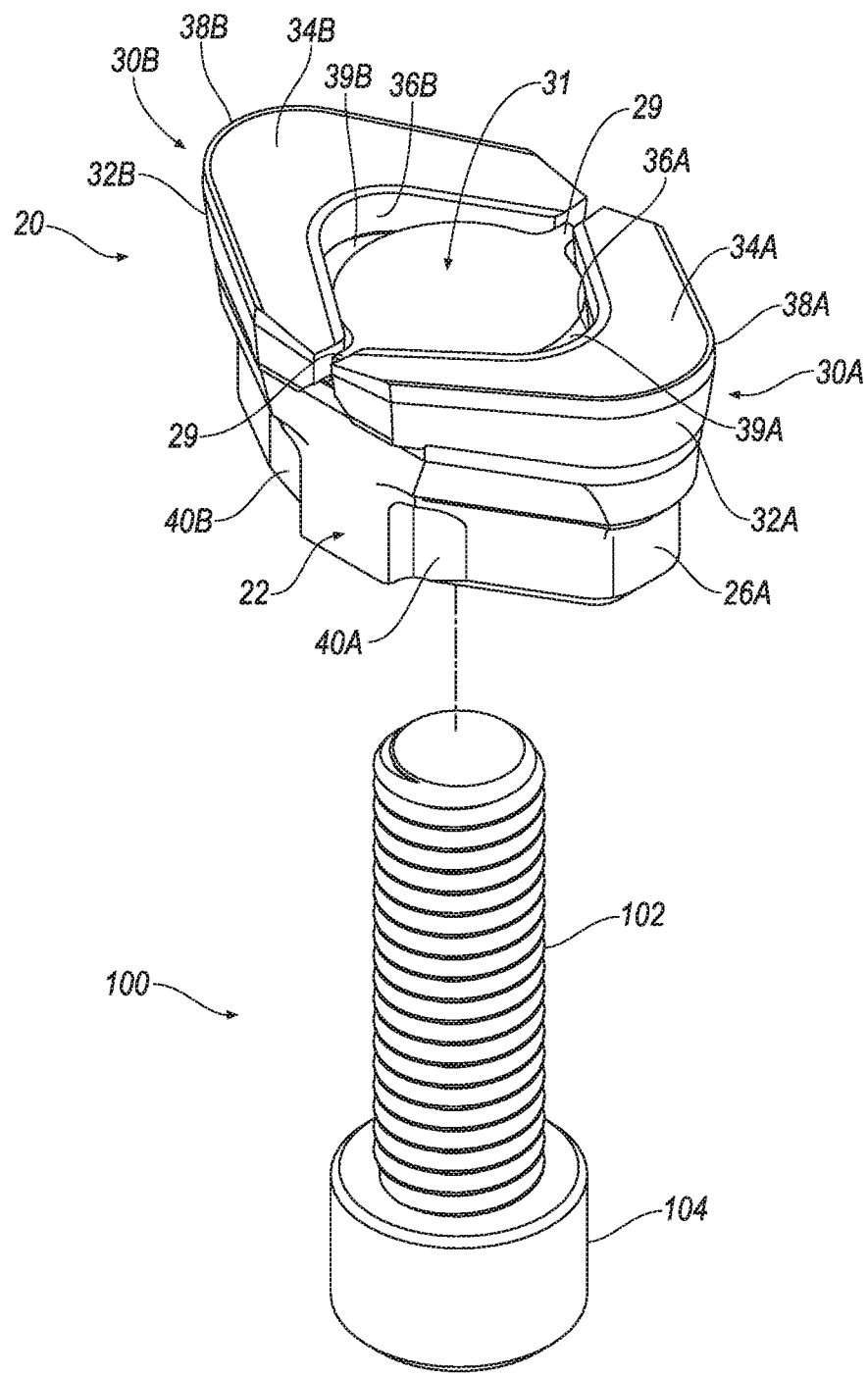
FIG. 8 is an isometric view of a stump cutter tooth in which the threaded opening comprises a blind hole.

The body 22 further includes a threaded opening, generally designated as 28, having internal threads capable of receiving the threaded fastener 100 to mount the stump cutter tooth 20 in the pocket member 50. In the illustrated embodiment, the threaded opening 28 is in the form of a raised boss. The threaded opening 28 defines an arcuate exterior wall 28A and 28B with a pair of opposing flanges disposed about 180 degrees apart from each other. In the illustrated embodiment, the threaded opening 28 is higher in elevation than each of the seating surfaces 24A, 24B. In one embodiment, the threaded opening 28 may be in the form of a blind hole 31, as shown in FIG. 8. In this embodiment, the threaded fastener 100 has a predetermined length so as to not pass through the threaded opening 28 (i.e., engage the wall of the blind hole).

The stump cutter tooth 20 further includes a pair of hard inserts 30A and 30B. Each hard insert (30A, 30B) is substantially identical to each other and each are shaped similar to a boomerang with a generally arcuate outer flank surface (32A, 32B), a generally planar top rake surface (34A, 34B) and a generally arcuate inner flank surface (36A, 36B). As used herein, an object that is shaped like a boomerang has a shape like a ruler that has a bend in the middle and the ends rounded off. Cutting edges 38A and 38B are formed at the intersections of the outer flank surfaces 32A and 32B and the top rake surfaces 34A and 34B, respectively. Each one of the cutting edges (38A, 38B) has a generally arcuate shape.

It should be appreciated that the generally planar top rake surfaces 34A and 34B could present a convex or a concave shape depending upon the specific application. It should be appreciated that any other generally planar surfaces presented by the hard inserts described herein could be convex or concave in shape.

Figure 7:
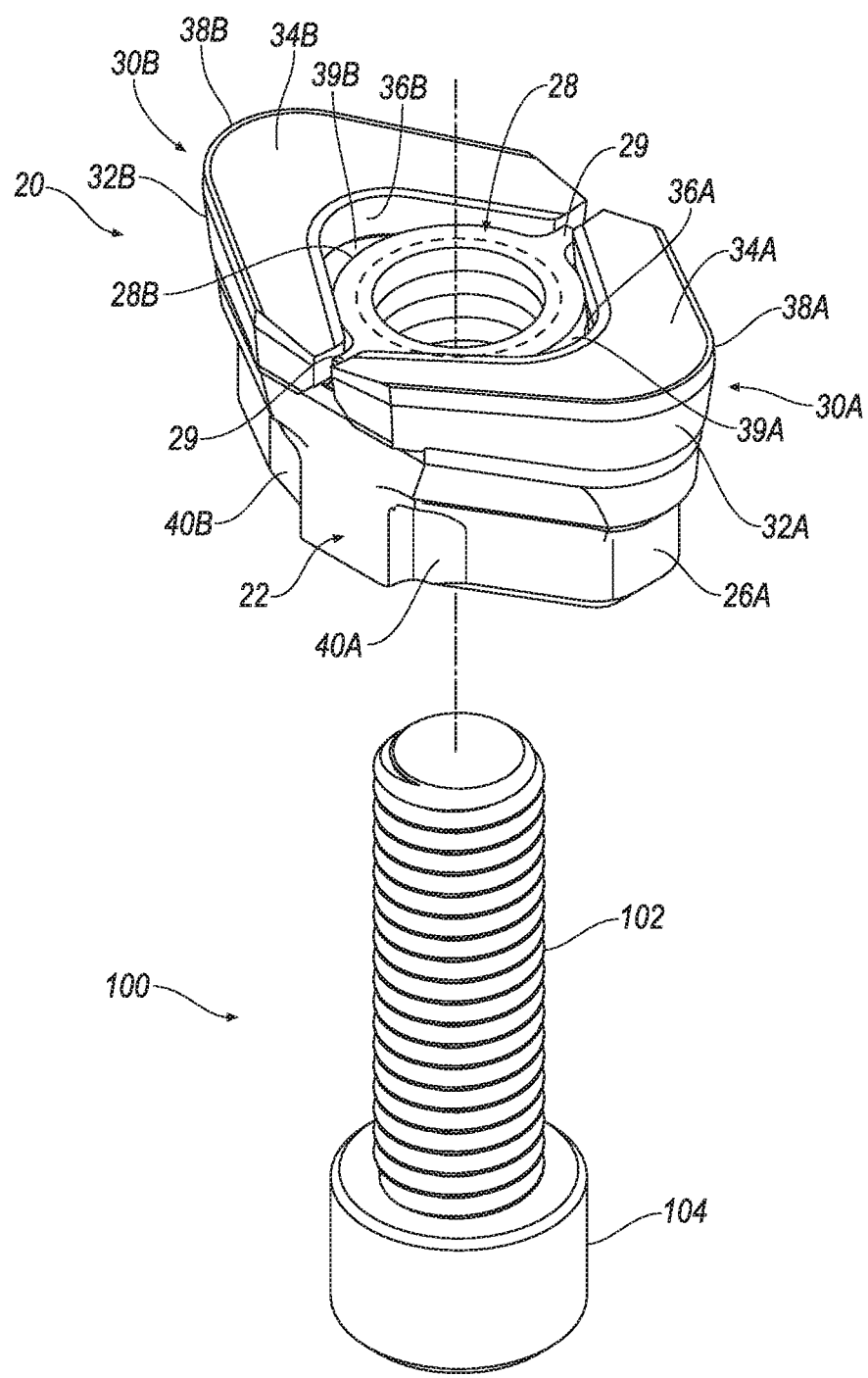
FIG. 7 is an isometric view of the stump cutter tooth of FIG. 6 in which the pair of hard inserts are affixed to the tooth body.

As shown in FIGS. 7 and 8, the hard inserts 30A and 30B are spaced apart a small distance by the flanges 29 of the opening 28 and the inner flank surfaces 36A and 36B are spaced a small distance from the arcuate exterior walls 28A and 28B of the opening 28. In addition, a cavity 39A and 39B is formed between the seating surfaces 24A and 24B, the exterior walls 28A and 28B of the opening 28 and the arcuate inner flank surfaces 36A and 36B of the hard inserts 30A and 30B. These cavities 39A and 39B trap debris during the cutting operation to provide protection against material-on-material wear of the stump cutter tooth assembly 10.

Each one of the hard inserts (30A, 30B) is typically made from a hard material such as, for example, cemented (cobalt) tungsten carbide. Additives (e.g., niobium, tantalum, titanium, chromium) may provide certain properties to the cemented (cobalt) tungsten carbide. The binder (i.e., cobalt) may also include iron and/or nickel. The average grain size of the tungsten carbide (or other hard particles) may be selected to impart desired properties to the cemented (cobalt) tungsten carbide. The hard insert may also be made from any one of polycrystalline diamond material, ceramics and cermets (e.g., alumina-based ceramics or titanium-based ceramics).

It should be appreciated that the hard (i.e., cutting) insert exhibits a hardness that is greater than the hardness of the cutter tooth body. Thus, it can be appreciated that the axial forward portion of the stump cutter tooth is harder than the axial rearward portion thereof. It is contemplated that in some instances, the axial forward portion of the cutter tooth body may exhibit a higher hardness than the balance of the cutter tooth body.

It should be appreciated that the steel bodies for the stump cutter teeth pockets can be made via a number of different processes including a process to quench and temper a carbon steel or an alloy steel. These pockets and cutter tooth bodies could also be cold headed forged or hot forged or investment cast or machined from wrought steel.

It should be pointed out that the above discussion of the materials for the hard inserts and the cutter bodies and pockets, as well as the materials for the braze alloys, and other means to attach the hard inserts to the cutter bodies and the hardness profiles of the cutter bodies and the relative hardness of the hard inserts as compared to the cutter bodies apply to all of the specific embodiments of the stump cutter teeth and pockets, even if not specifically set forth in conjunction therewith.

Brazing is the preferred way to affix the hard inserts 30A and 30B to the body 22, as shown in FIG. 7. It should be appreciated that the hard inserts 30A and 30B may also be affixed to the cutter tooth body 22 via an adhesive such as, for example, an epoxy. Further, it is contemplated that the hard inserts 30A and 30B may be affixed to the cutter tooth body 22 via mechanical means such as, for example, a clamp or bolt or the like that mechanically acts on the hard inserts 30A and 30B.

Figure 9:
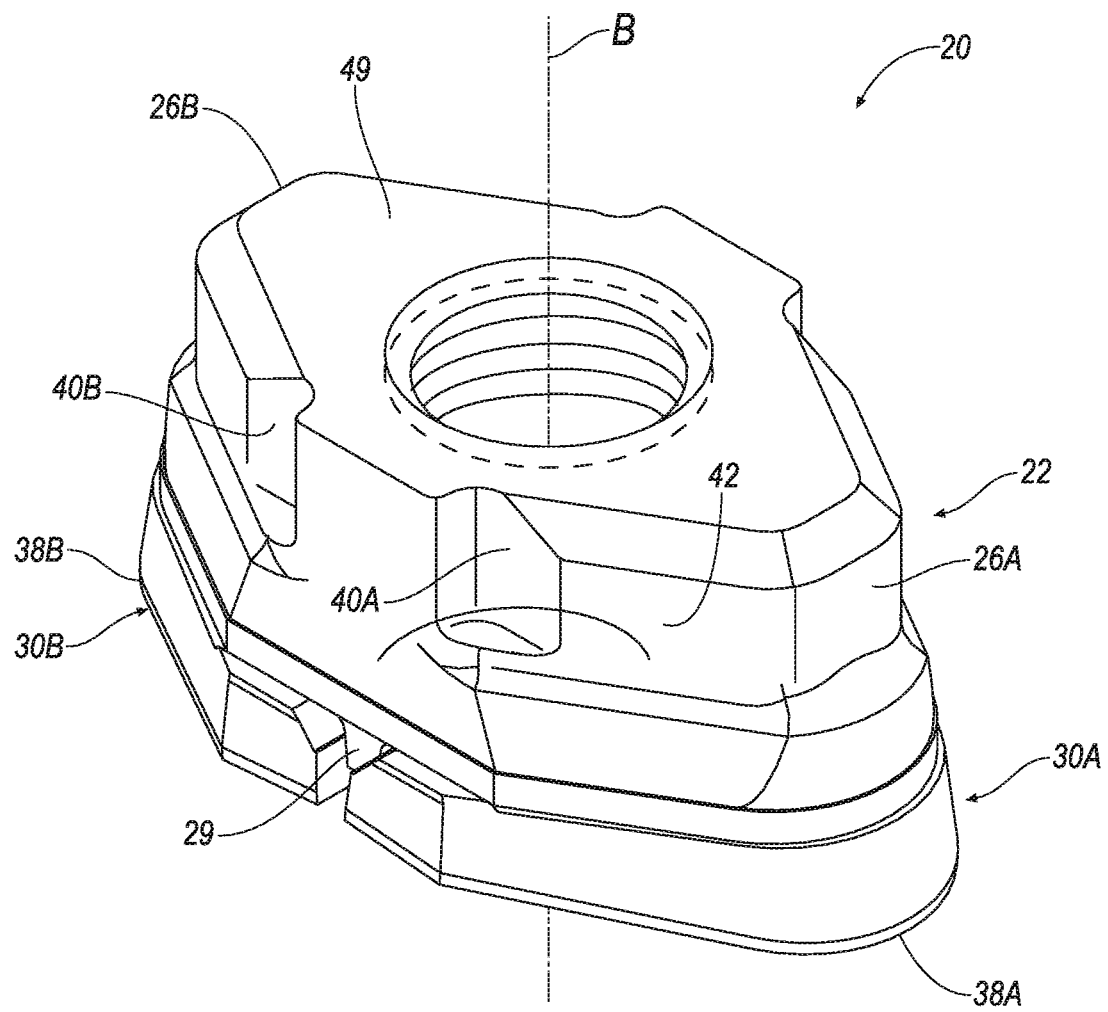
FIG. 9 is an isometric bottom view of the stump cutter tooth of FIG. 6.
Figure 10:
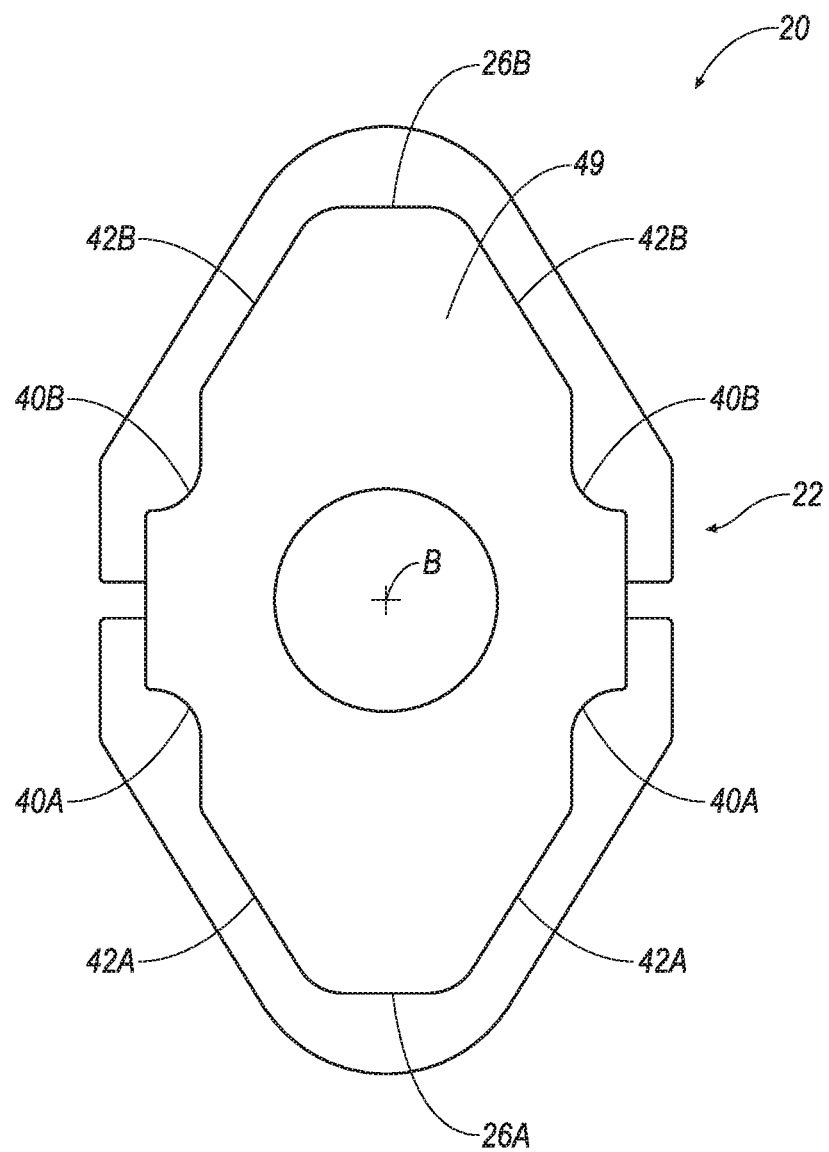
FIG. 10 is a bottom view of the stump cutter tooth of FIG. 6.

Referring to FIGS. 6-9, one aspect of the invention is that the body member 22 includes one or more recesses 40A and 40B formed in a lower peripheral surface 42A, 42B of the body member 22 of the stump cutter tooth 20. The recesses 40A and 40B are located on the peripheral surfaces 42A, 42B, respectively, so as to cooperate with a respective tab 75A and 75B formed on the pocket member 50. As seen in FIG. 9, each recess 40A and 40B extends from a bottom surface 49 of the body member 22 a sufficient distance to enable the respective tab 75A and 75B of the pocket member 50 (see FIGS. 16-18) to be disposed therein. The cooperation between the one or more recesses 40A and 40B of the stump cutter tooth 20 and the one or more tabs 75A and 75B of the pocket member 50 defines an anti-rotation feature that prevents unwanted movement between the stump cutter tooth 20 and the pocket member 50 during a cutting operation. In addition, the one or more recesses 40A and 40B and the one or more tabs 75A and 75B provide a locating feature for properly locating the stump cutter tooth 20 in the pocket member 50.

It should be appreciated that the invention is not limited in any way whatsoever to the geometrical shape of the bottom surface 49 of the stump cutter tooth 20, and that the invention can be practiced using any desirable geometrical shape, so long as the stump cutter tooth 20 can properly mate with the pocket member 50.

Figure 11:
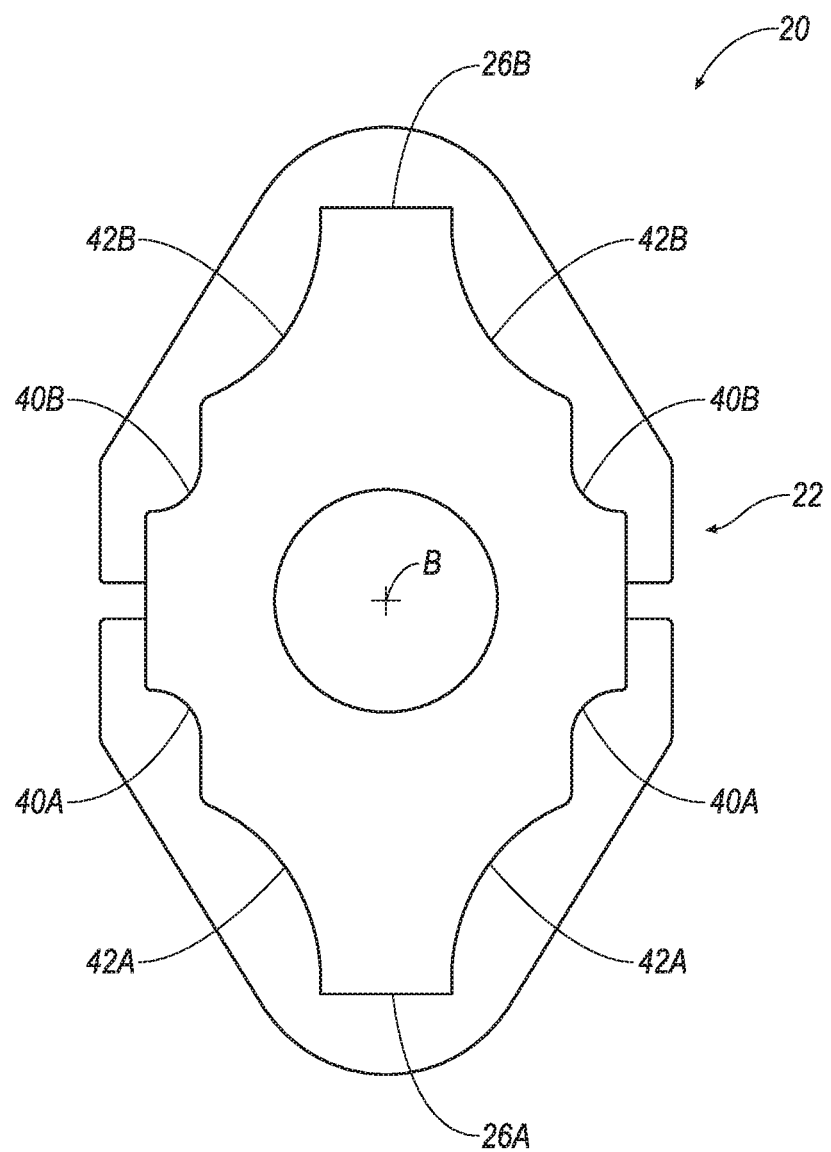
FIG. 11 is a bottom view of a stump cutter tooth with a different geometrical shape than the stump cutter tooth of FIG. 10.
Figure 12:
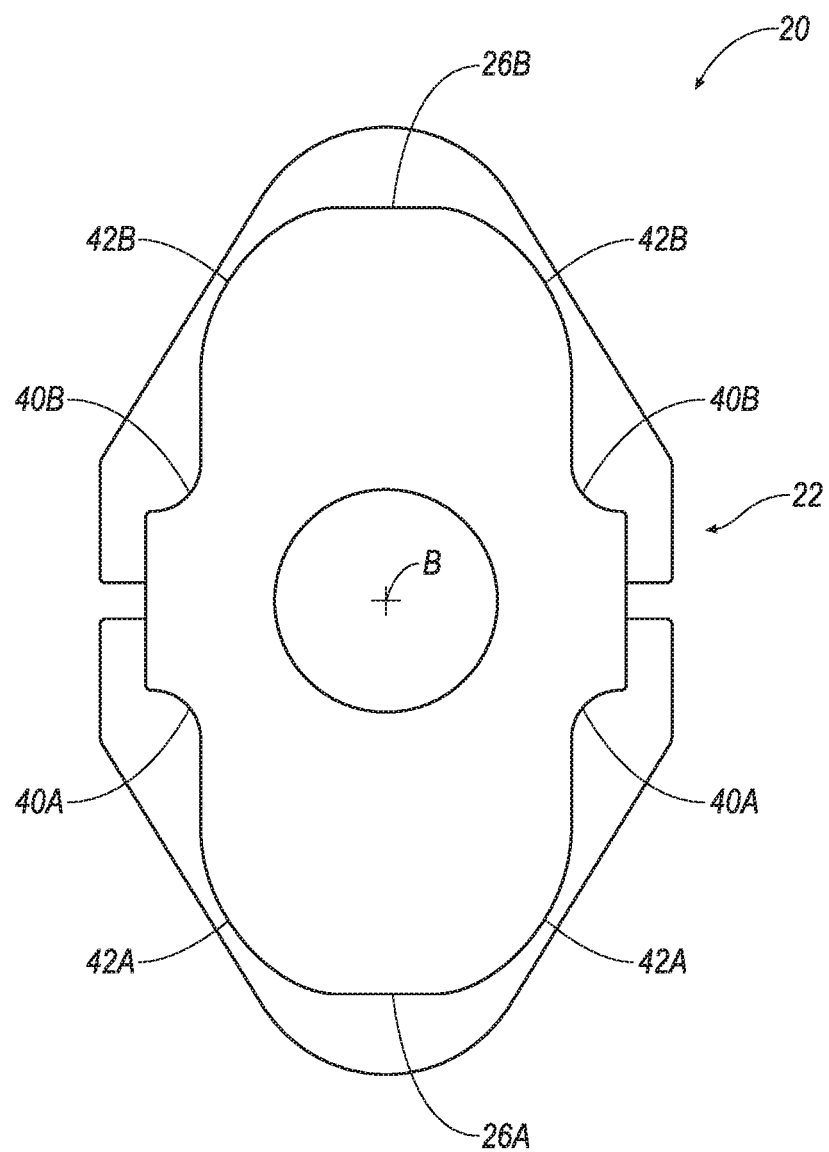
FIG. 12 is a bottom view of a stump cutter tooth with a different geometrical shape than the stump cutter tooth of FIG. 10.

FIGS. 11 and 12 illustrate some possible alternative geometrical shapes for the bottom surface 49 of the stump cutter tooth 20. It should be appreciated that many other alternative geometrical shapes for the bottom surface 49 fall within the scope of the invention, and that the geometrical shapes shown in the Figures are for illustrative purposes only.

Figure 13:
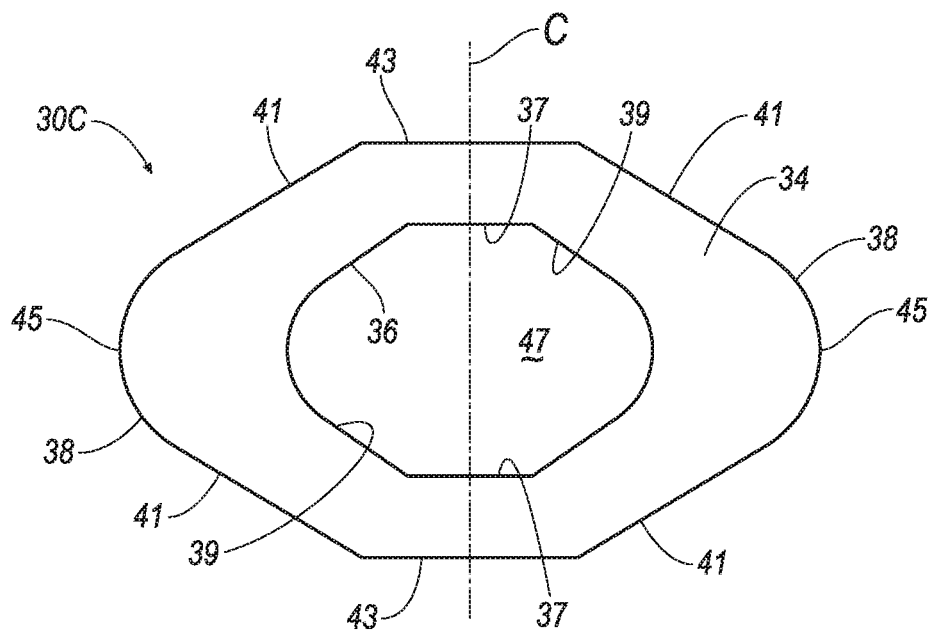
FIG. 13 is a top view of a hard insert according to another embodiment of the invention.
Figure 14:
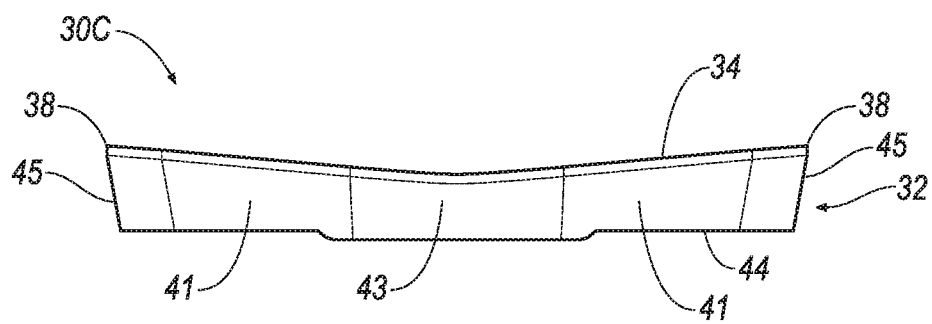
FIG. 14 is a side view of the hard insert of FIG. 13.
Figure 15:
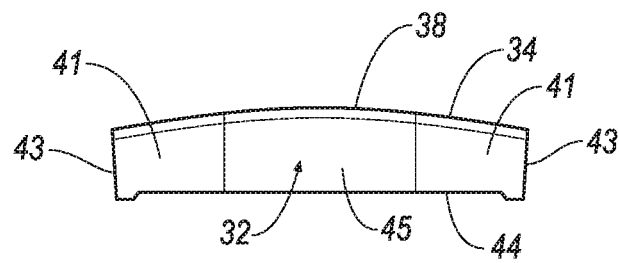
FIG. 15 is an end view of the hard insert of FIG. 13.

In the above embodiment of the stump cutter tooth 20, the stump cutter tooth 20 includes a pair of hard inserts 30A and 30B (see FIGS. 6-9). However, it should be appreciated that the invention can be practiced by replacing the pair of hard inserts 30A and 30B with a hard insert 30C having unitary construction, as shown in FIGS. 13-15. In general, the cutting insert 30C is elliptical in shape and is substantially symmetrical about an axis C-C that is perpendicular to the central longitudinal axis B-B of the cutter tooth body 22 (see FIG. 6). The hard insert 30C is generally annular having a bottom surface 44, a generally planar top rake surface 34, an inner flank surface 36 and an outer flank surface 32. The inner flank surface 36 has a substantially planar portion 37 and an arcuate portion 39. Similarly, the outer flank surface 32 has substantially planar portions 41 and 43 and an arcuate portion 45 to define a generally "U" or "V"-shaped profile.

In addition, it should be appreciated that the generally planar top rake surface 34 could present a convex or a concave shape depending upon the specific application. It should be appreciated that the any other generally planar surfaces presented by the cutting inserts described herein could be convex or concave in shape.

Similar to the embodiment with the pair of hard inserts 30A and 30B, the inner flank surface 36 defines an opening 47 extending entirely through the cutting insert 30C from the bottom surface 44 to the top surface 34 that cooperates with the cutting tooth body 22, and in particular with the threaded opening 28 and seating surfaces 24A and 24B to trap debris during a cutting operation. Similar to the hard inserts 30A and 30B, the cutting insert 30C also has a primary cutting edge 38 at the intersection of the top rake surface 34 and the arcuate portion 45 of the outer flank surface 32. In addition, a portion of the primary cutting edge 38 is formed at an intersection between the top rake surface 34 and the planar portion 41 of the outer flank surface 32. Because the cutting insert 30C is symmetric about the axis C-C, the cutting insert 30C has a total of two primary cutting edges 38 on opposite ends of the hard insert 30C.

During operation, the selected primary cutting edge 38 impinges the material and experiences a greater amount of wear as compared to the other cutting edges. Over time, the selected primary cutting edge 38, 38A, 38B wears to a point where it does not function in an efficient and/or useful fashion. At this point (or shortly prior to this point), the operator will need to unfasten the stump cutter tooth 20 and rotate it 180 degrees to orient the hard inserts 30A, 30B or 30C so the other primary cutting edge 38, 38A, 38B primarily impinges upon the material. As can be appreciated, stump cutter tooth 20 provides an indexable cutter tooth that is relatively easy to unfasten and rotate to expose a new primary cutting edge 38, 38A, 38B.

Figure 16:
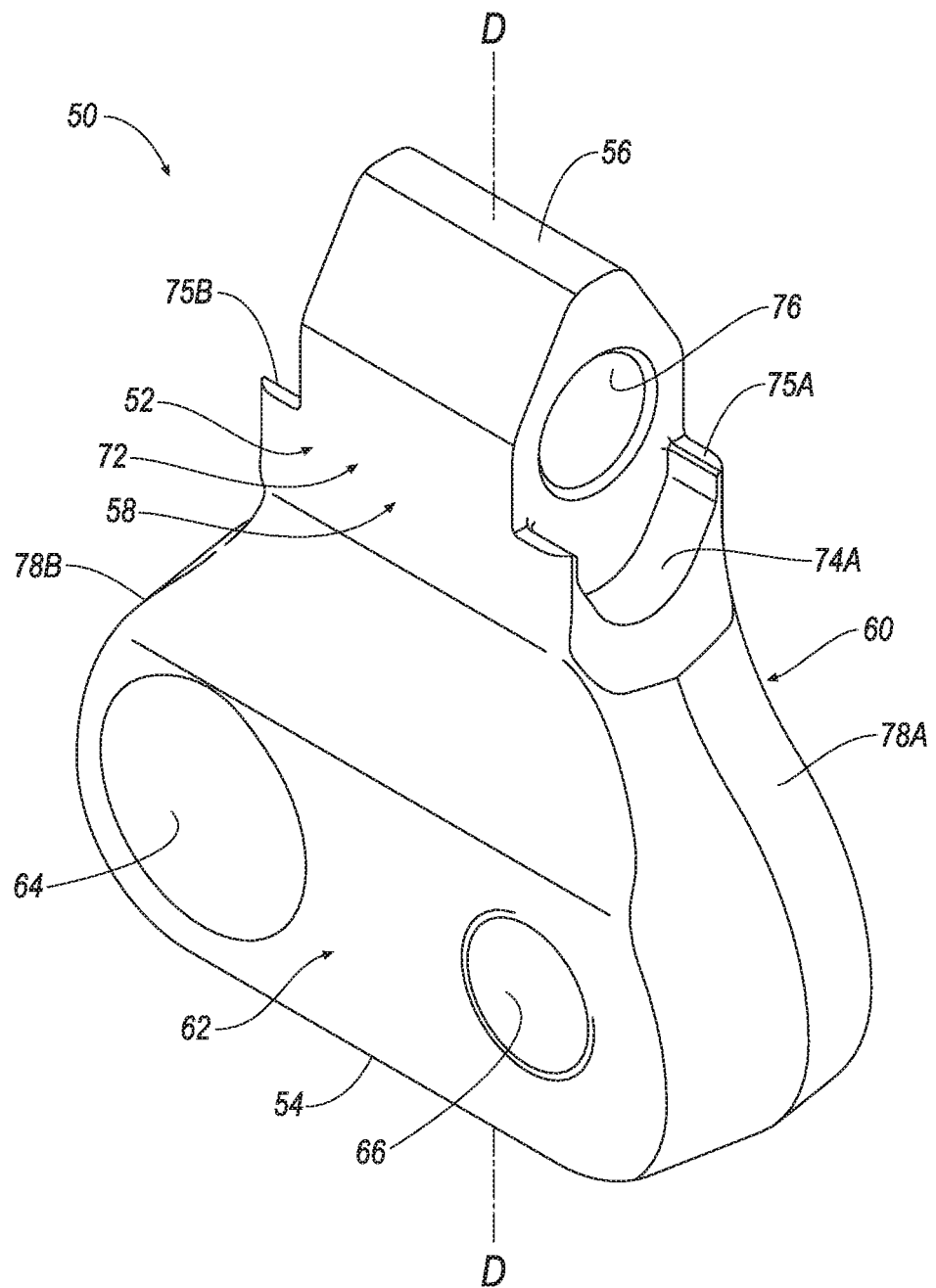
FIG. 16 is an isometric view of the straight pocket member of FIG. 1.

As mentioned earlier, one of the styles of the pocket members that can be used to hold a stump cutter tooth is a straight pocket. FIG. 16 shows a straight pocket member, generally designated as 50. The straight pocket 50 includes a pocket body 52 that has a radial inner end 54 and a radial outer end 56. The pocket body 52 also has an outer side surface 58 and an opposite inner side surface 60. When the pocket member 50 is securely affixed to the driven cutting wheel, the inner side surface 60 is pressed against a selected one of the side surfaces of the cutting wheel.

Figure 3:
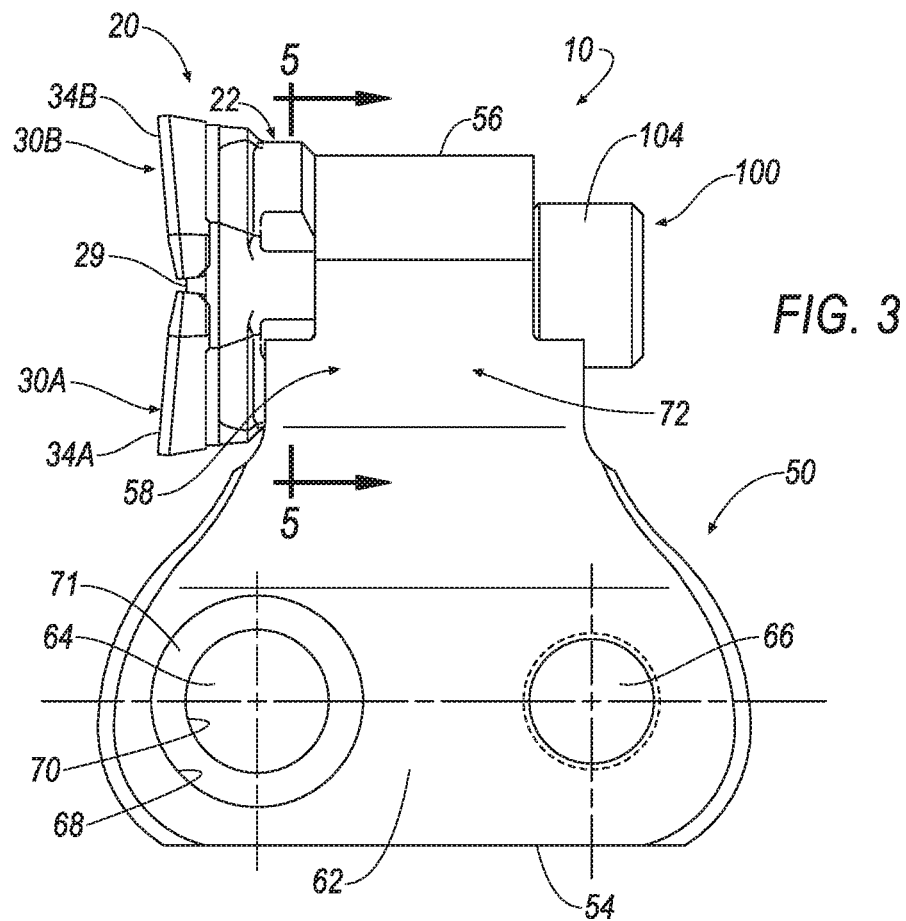
FIG. 3 is a side view of the stump cutter tooth assembly of FIG. 1 when assembled.
Figure 4:
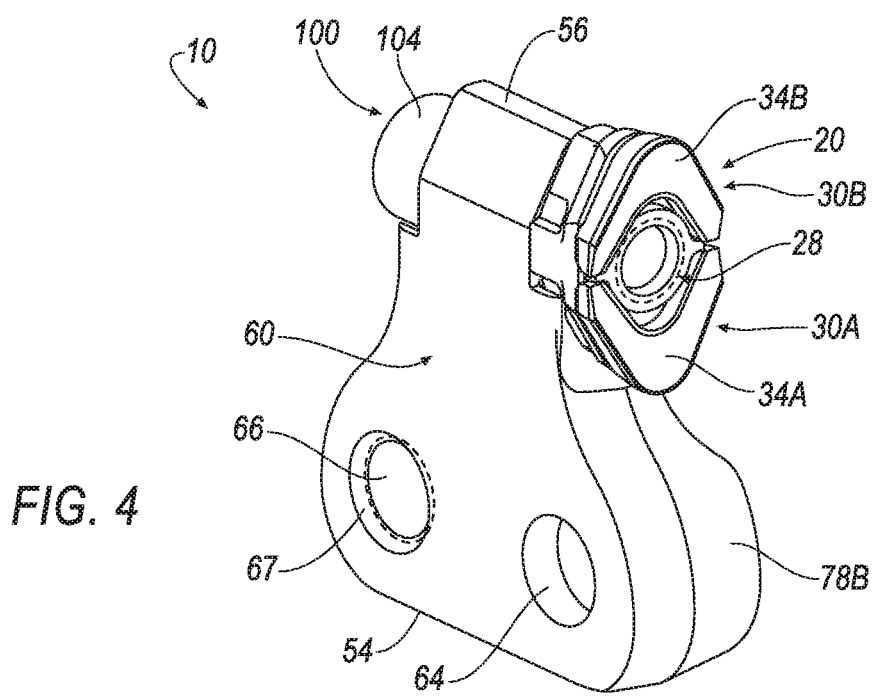
FIG. 4 is another isometric view of the stump cutter tooth assembly of FIG. 1 when assembled.
Figure 5:
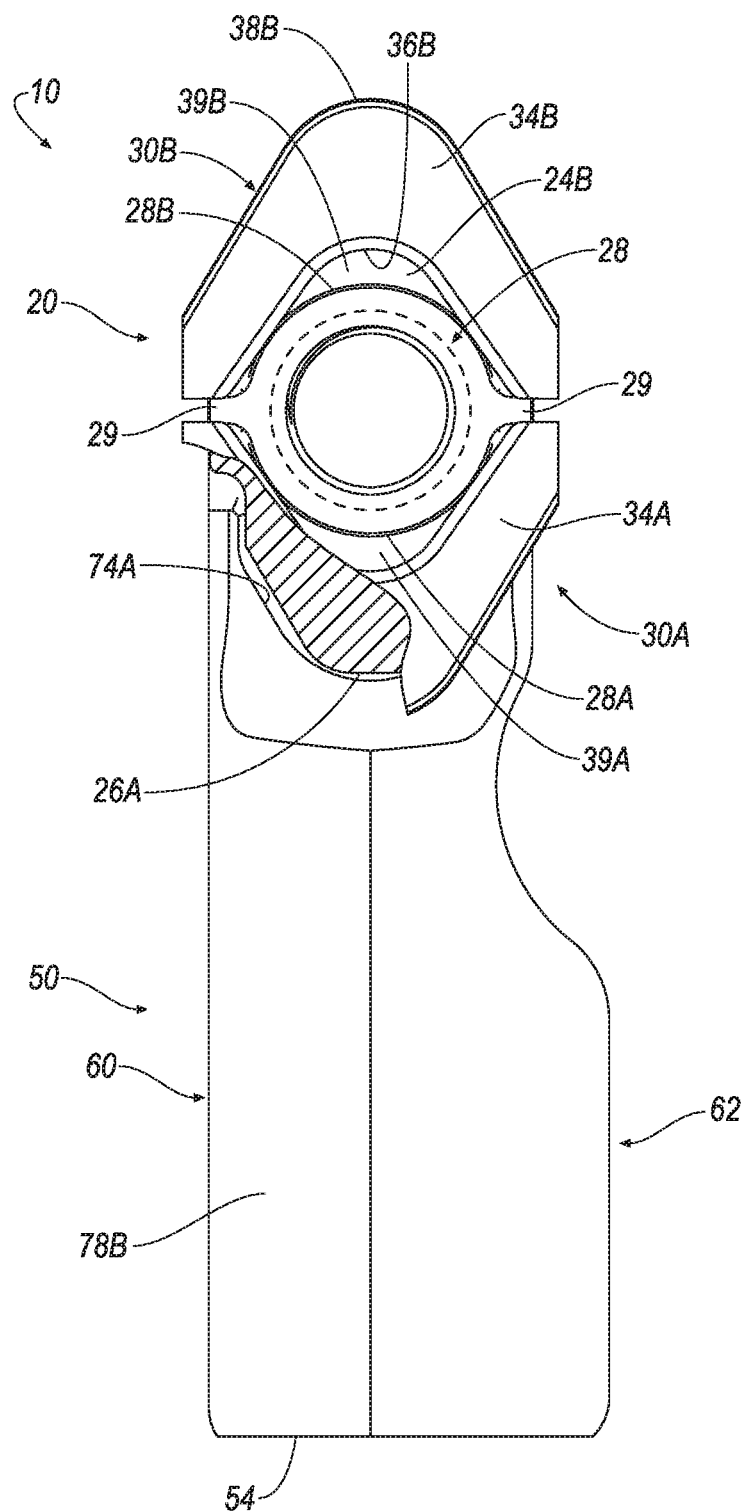
FIG. 5 is an enlarged, partial cross-sectional view of the stump cutter tooth assembly taken along line 5-5 of FIG. 3.
Figure 6:
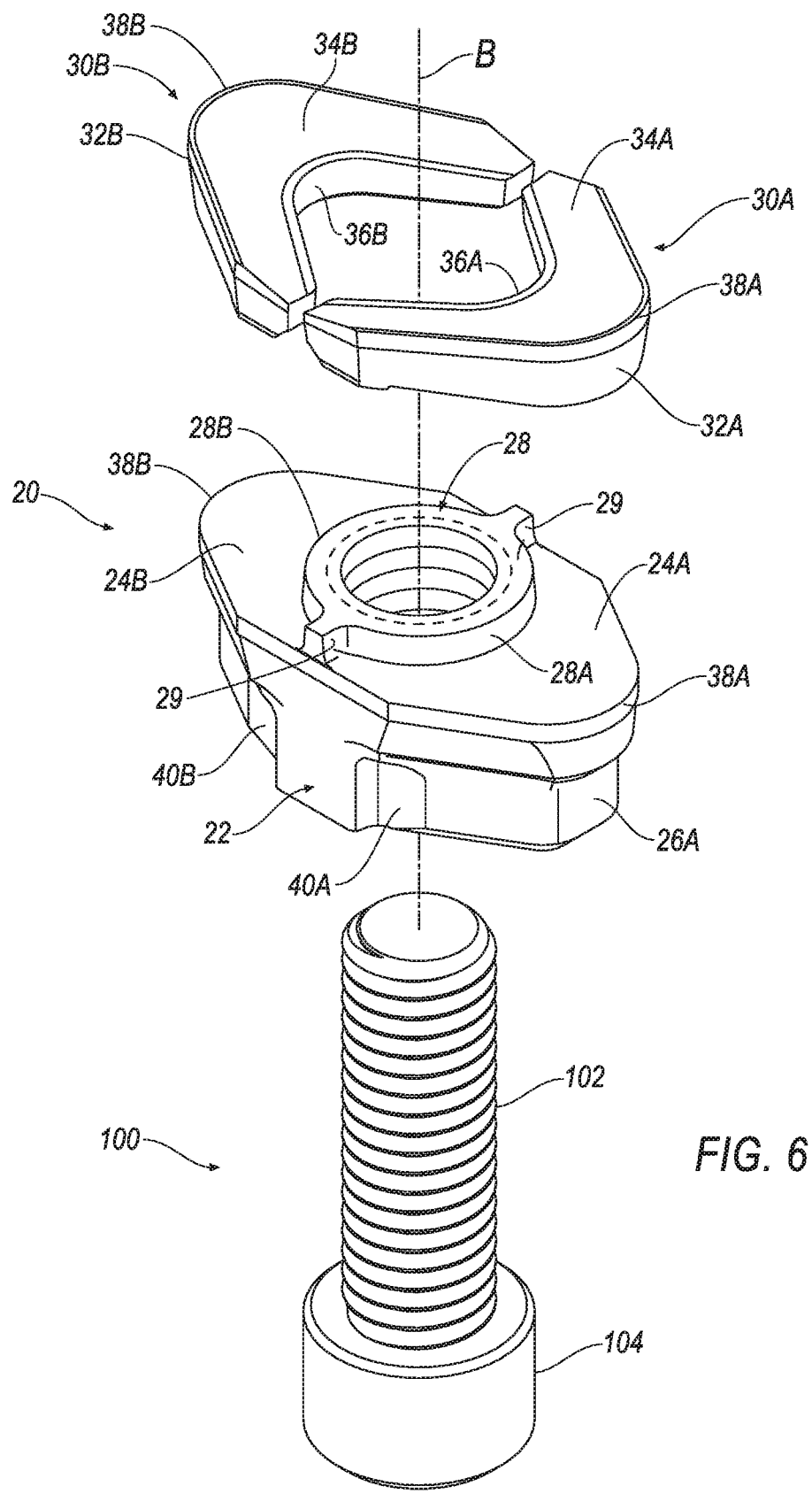
FIG. 6 is an exploded, isometric view of s stump cutter tooth according to an embodiment of the invention.

The pocket body 52 has an enlarged (or base) portion 62 adjacent to the radial inner end 54 thereof. The pocket body 52 further includes a reduced portion 72 that extends from and is integral with the base portion 62. As can be seen from FIG. 16, the base portion 62 has an enlarged thickness and width as compared to the reduced portion 72. The enlarged base portion 62 contains a pair of bores 64 and 66 therein. As illustrated in FIG. 3, the bore 64 is a smooth bore that includes an enlarged counterbore portion (that has an enlarged diameter) section 68 and a reduced diameter section 70. A shoulder 71 provides a transition between the enlarged counterbore portion 68 and the reduced diameter portion 70 of the bore 64. The bore 66 is a threaded bore in which the threaded portion is of a generally constant diameter. As illustrated in FIG. 4, the bore 66 has a frusto-conical portion 67 at the one end thereof adjacent to the inner side surface 60.

Referring back to FIG. 16, the straight pocket member 50 has opposite side surfaces 78A and 78B. The reduced portion 72 contains a bore 76 that passes between the opposite side surfaces 78A and 78B. The bore 76 has a sufficient diameter to allow a shaft portion 102 of the threaded fastener 100 to pass therethrough and be threaded into the threaded opening 28 of the stump cutter tooth 20.

An arcuate shoulder 74A and 74B is on each one of the opposite edge surfaces (78A and 78B, respectively) at a location near where the pocket body 52 transitions between the base portion 62 and the reduced portion 72. Arcuate shoulder 74B is not visible in FIG. 16, but shoulder 74B is located on the opposite side as arcuate shoulder 74A. The shoulder 74A corresponds to first side surface 78A and the shoulder 74B corresponds to second side surface 78B. Again, although it will be described in more detail hereinafter, when attached to the straight pocket member 50, the stump cutter tooth 20 engages a selected one of the shoulders 74A and 74B to help keep the stump cutter tooth 20 from rotating during the stump cutting operation. Thus, it can be said that each shoulder 74A and 74B functions as an abutment or a stop with respect to the stump cutter tooth 20 to help keep the stump cutter tooth 20 from rotating during the stump cutting operation.

It should be appreciated that each one of the shoulders (74A and 74B) is spaced apart from the bore 76 to provide clearance for the head 104 of the threaded fastener 100.

It should also be appreciated that the straight pocket member 50 is bi-directional in the sense that it can be positioned and reattached to the opposite side surface of the wheel. This becomes especially important in the event the forward face or one of the edges of the pocket member 50 becomes damaged during use. If this occurs, the pocket member 50 can be removed from the wheel, rotated 180 degrees and moved to the other side of the wheel. By doing this, the previously forward face (which was damaged) becomes the rearward face and the previously rearward face becomes the forward face. In order for this to be the case, the reduced portion 72 (or most of the reduced portion) of the pocket member 50 is symmetrical about the central axis D-D, as shown in FIG. 16. The corresponding opposite straight pocket also has to be switched to its opposite side of the wheel. This bi-directional feature allows for the easy and quick reuse of a damaged pocket member.

Further, it should be appreciated that when the stump cutter tooth 20 is mounted in the bore 76 of the pocket member 50, the hard insert 30A and 30B that is not in direct engagement with the stump helps protect the surface 78A and the arcuate shoulder 74A from wear due to impingement of debris during the cutting operation.

On occasion the surface 78B (or shoulder 74B) of the pocket member 50 may suffer damage such that the pocket member 50 no longer functions in a useful (or optimum) fashion. In this embodiment, rather than replace the pocket member 50 with a new pocket member, the operator can remove the partially damaged (or worn) straight pocket and reposition it on the other side of the wheel so as to have an orientation like that of the right hand straight pocket. After being repositioned, it can be seen that the previous forward edge, for example surface 78A, which was damaged or worn, becomes the rearward face, and the previous rearward edge, for example surface 78B, becomes the forward face that experiences most of the impingement of the cutting debris. The corresponding opposite straight pocket also has to be switched to its opposite side of the wheel so that the bores correspond to one another (i.e., a bore with the counter bore in one pocket must correspond to a threaded bore of the other pocket). Although it will be mentioned hereinafter, it should be appreciated that the other pockets (i.e., the crossover pocket and the offset pocket) also have the bi-directional capability, wherein the bi-directional capability of the pockets enhances the serviceability of the stump cutter assembly 10 and reduces downtime for the stump cutter assembly 10.

As mentioned earlier, one aspect of the invention is that the arcuate shoulder 74A and 74B of the pocket member 50 includes one or more tabs 75A and 75B, respectively, that cooperate with a respective recess 40A and 40B formed in the body member 22 of the stump cutter tooth 20. This cooperation between the of one or more recesses 40A and 40B of the stump tooth cutter 20 and the one or more tabs 75A and 75B of the pocket member 50 defines an anti-rotation feature of the invention. In addition, the one or more recesses 40A and 40B and the one or more tabs 75A and 75B provide a locating feature for properly locating the stump cutter tooth 20 in the pocket member 50.

Prior to operation, the operator orients the stump cutter tooth 20 to select which one of the primary cutting edges 38A and 38B (see FIG. 5) will primarily impinge (or engage) upon the material (e.g., earth strata, wood products and the like) to be impinged and disintegrated, and then fasten the stump cutter tooth 20 in the selected orientation. In the illustrated embodiment shown in FIG. 1, the threaded fastener 100 enters at the rear of the pocket member 50, then passes through the opening 76, and is then threaded into the threaded opening 28 of the stump cutter tooth 20 when affixing the stump cutter tooth 20 to the pocket member 50. However, it will be appreciated that the invention is not limited by the manner in which the threaded fastener 100 is used to affix the stump cutter tooth 20 to the pocket member 50.

Figure 17:
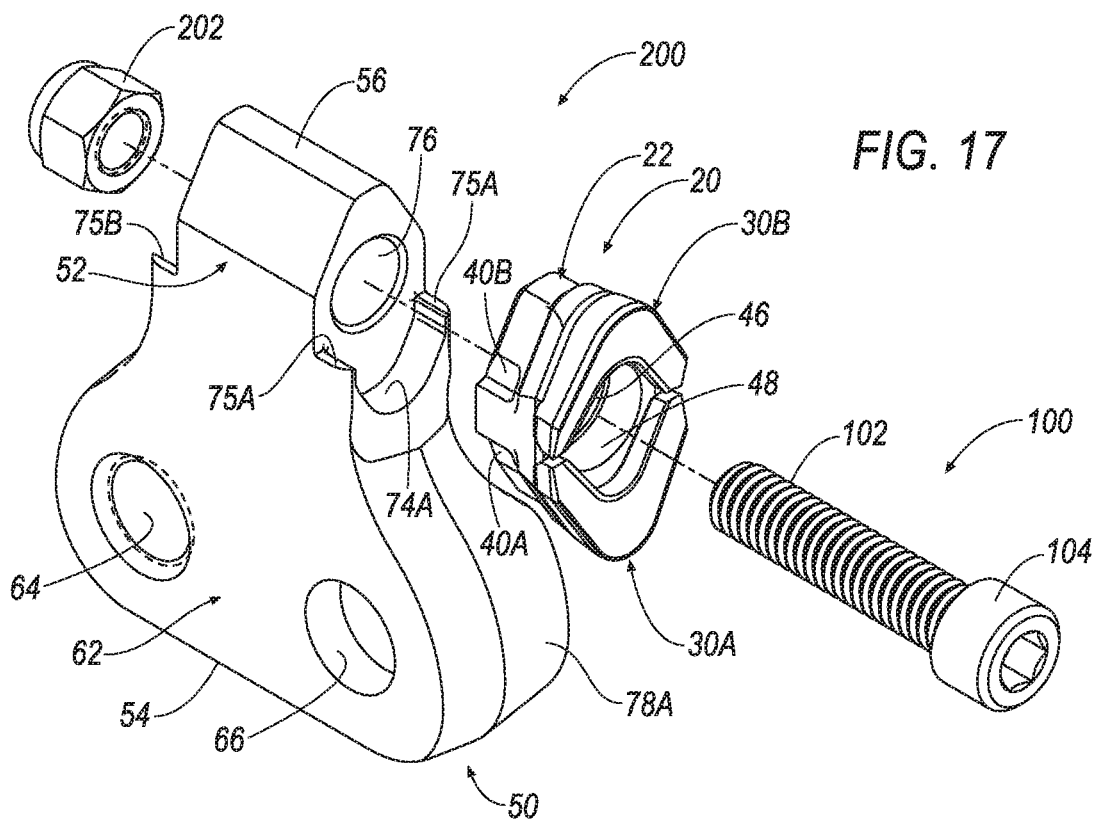
FIG. 17 is an exploded, isometric view of a stump cutter tooth assembly similar to the stump cutter tooth assembly of FIG. 1, except that the threaded fastener in is fed through the front of the stump cutter tooth, instead of the rear of the stump cutter tooth.

Referring now to FIG. 17, a stump cutter tooth assembly 200 is shown according to another embodiment of the invention. In this embodiment, the threaded fastener 100 enters the front of the pocket member 50, then passes through an opening 46 in the stump cutter tooth 20 and is then threaded into a nut 202 at the rear of the pocket member 50. The head 104 of the threaded fastener 100 engages a stop surface 48 within the opening 46 when mounting the stump cutter tooth 20 in the pocket member 50. The opening 46 is preferably non-threaded having a sufficient diameter to allow the threaded fastener 100 to pass therethrough, but it is envisioned that the opening 46 can be threaded such that the threaded fastener 100 is threaded into the opening 46 of the stump cutter tooth 20. Similar to the earlier embodiment, the body 22 of the stump cutter tooth 20 has one or more recesses 40A and 40B that cooperate with one or more tabs 75A and 75B formed on the pocket member 50 to provide an anti-rotation and locating feature of the invention.

Figure 18:
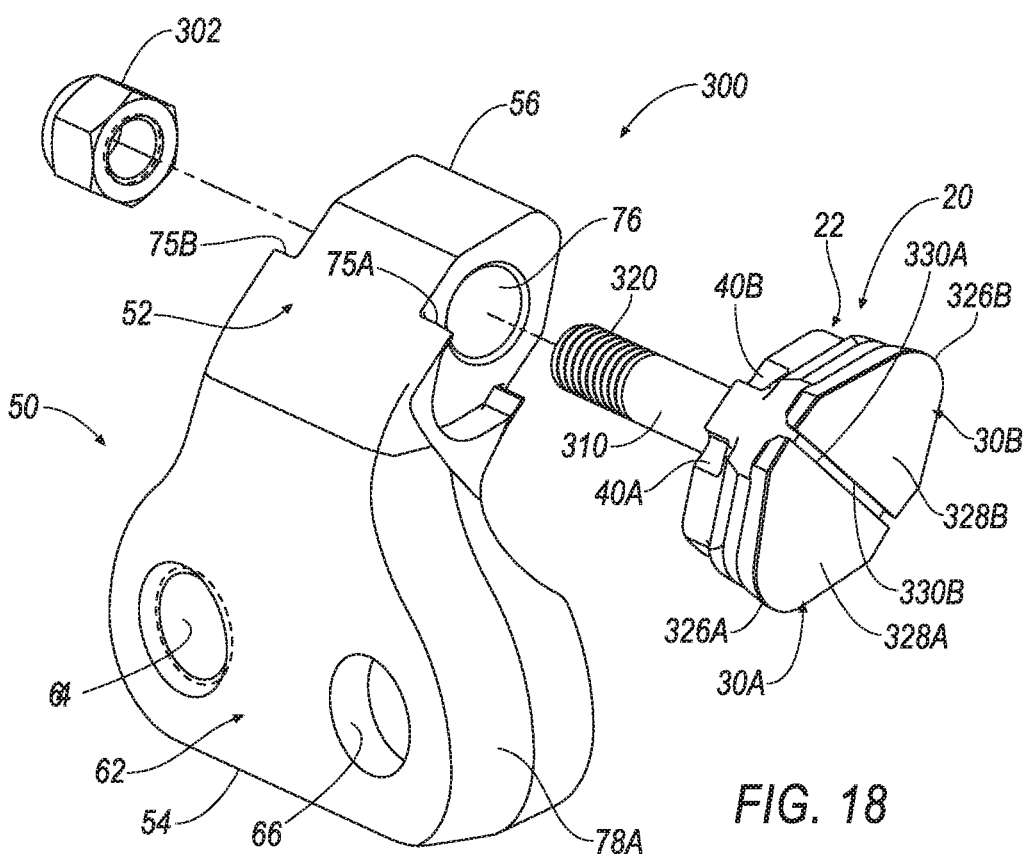
FIG. 18 is an exploded, isometric view of a stump cutter tooth assembly according to another embodiment of the invention.
Figure 19:
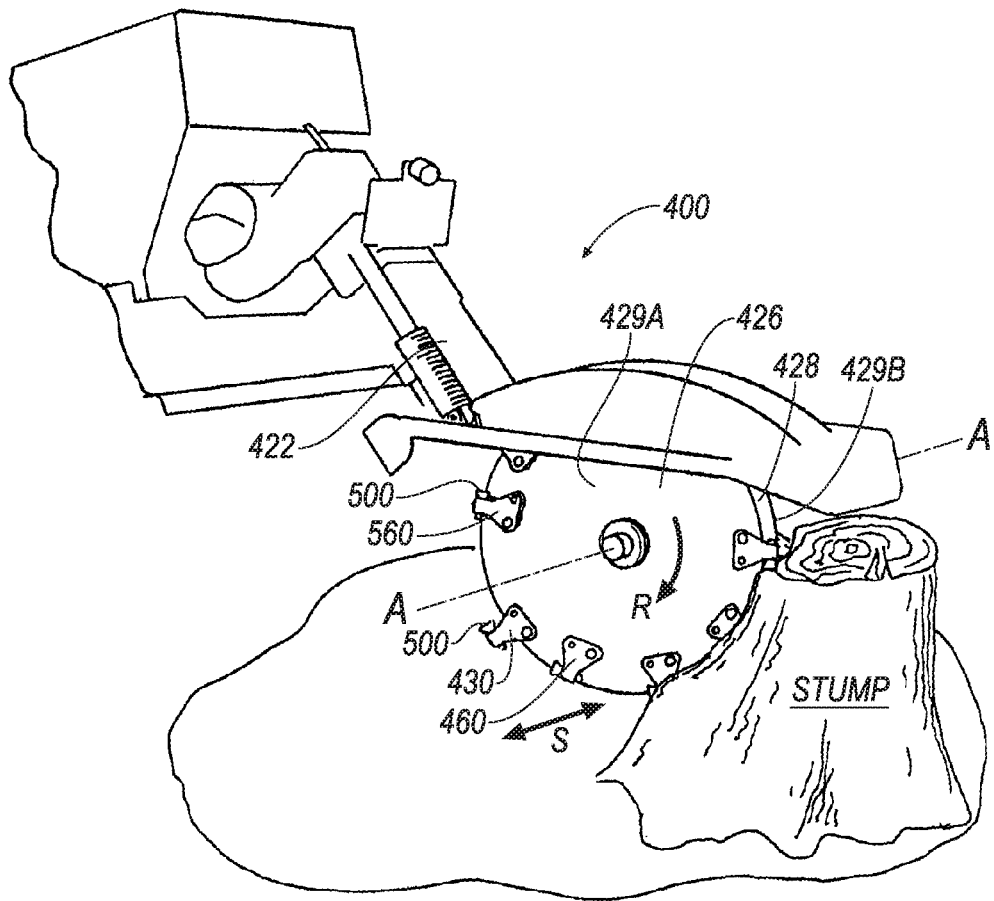
FIG. 19 is an isometric view of a conventional stump cutter assembly in engagement with a stump.
Figure 20:
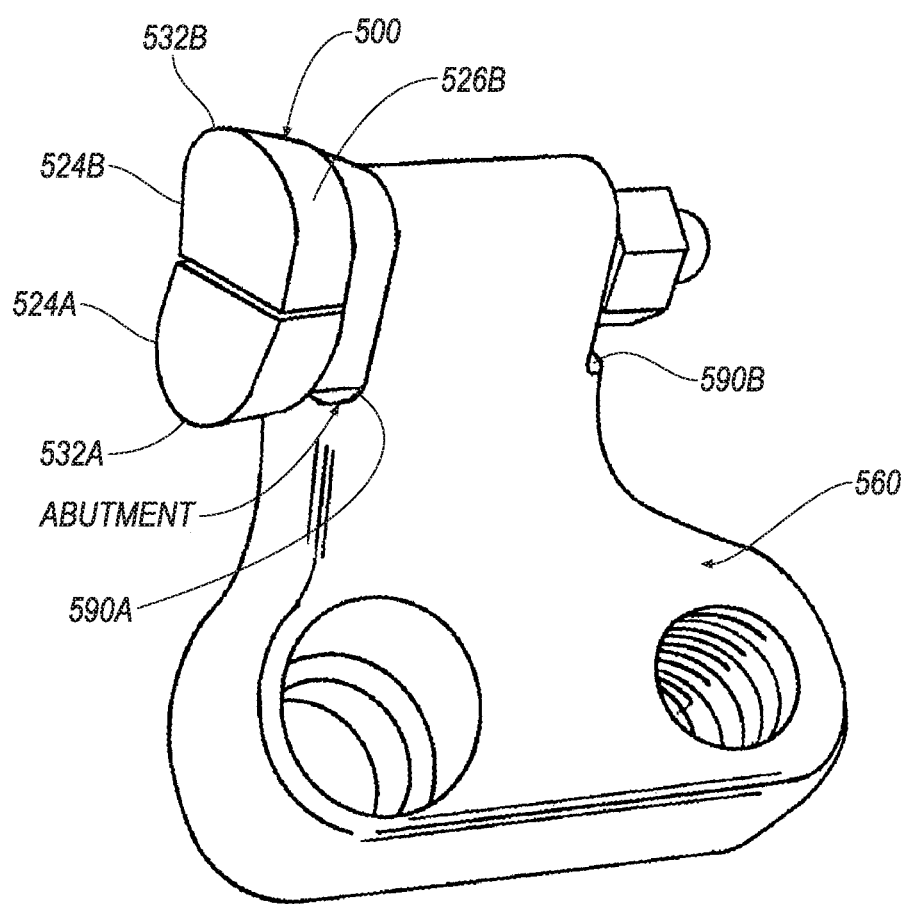
FIG. 20 is an isometric view of a conventional stump cutter tooth assembly comprising a stump cutter tooth and a pocket member.
Figure 21:
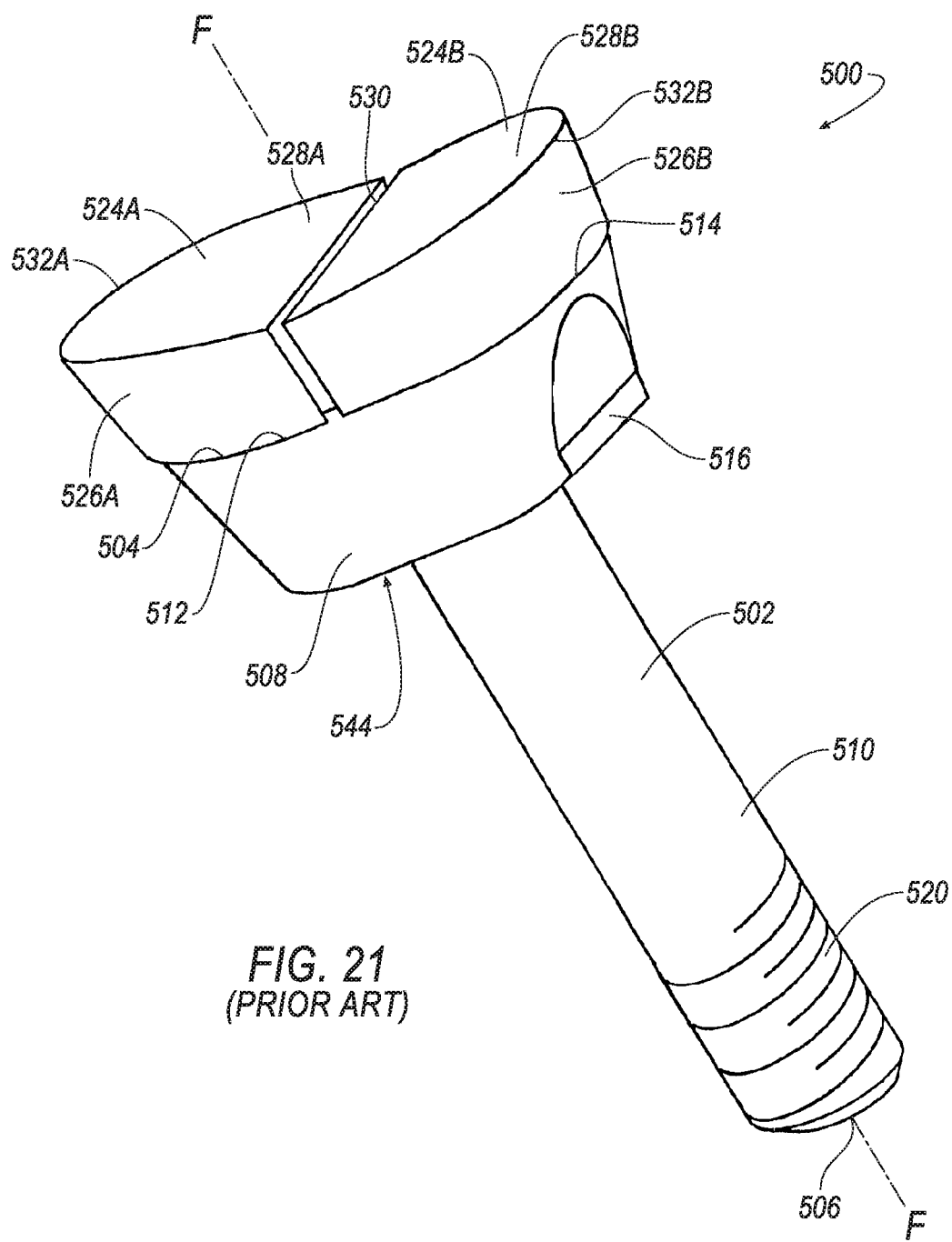
FIG. 21 is an isometric view of the stump cutter tooth of FIG. 20 having two separate hard inserts affixed to an axial forward end of the stump cutter tooth.
Figure 22:
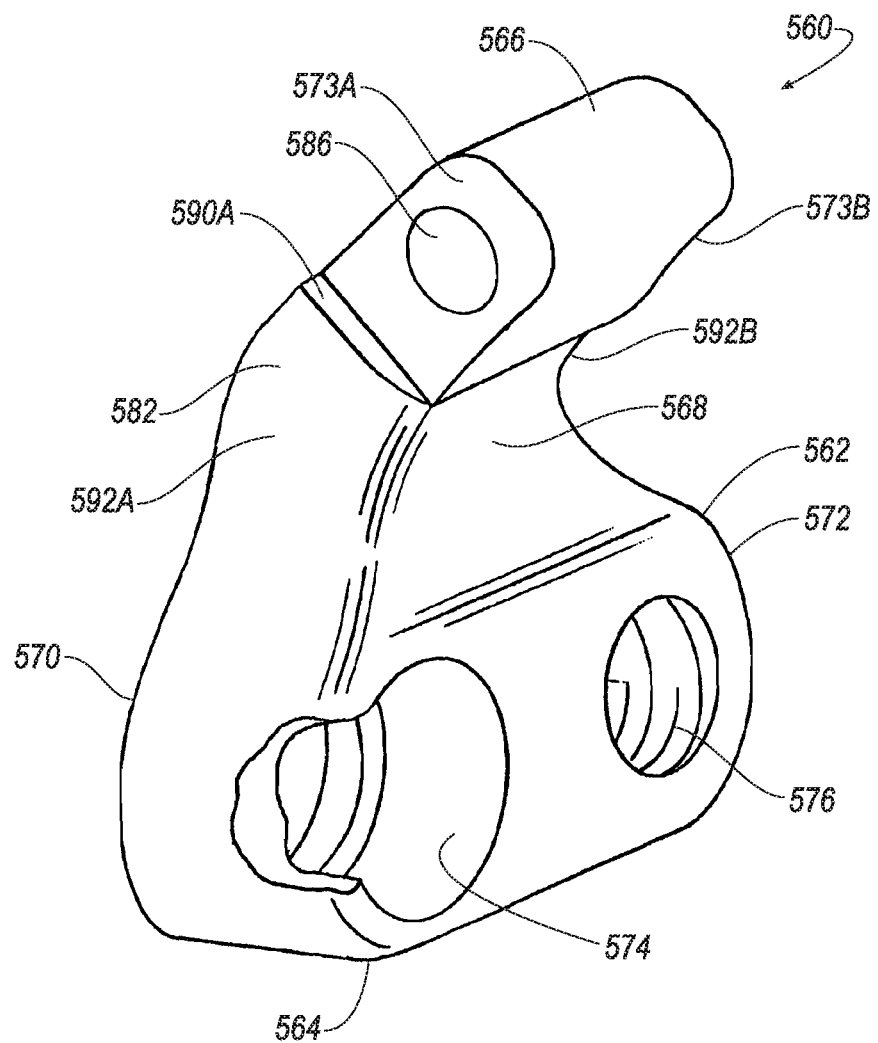
FIG. 22 is an isometric view of the pocket member of FIG. 20 having a planar stop or abutment surface.

Referring now to FIG. 18, a stump cutter tooth assembly 300 is shown according to another embodiment of the invention. In this embodiment, the stump cutter tooth 20 has a shank portion 310 with a threaded portion 320 extending rearwardly from the body 22 that enters the front of the pocket member 50, then passes through the opening 76 in the pocket member 50 and is then threaded into a nut 302 at the rear of the pocket member 50. It is noted that the pocket member 50 shown in FIG. 18 comprises an offset pocket member in which the inner side surface 62 is adjacent to and pressed against a selected one of the sides (429A, 429B) (see FIG. 19) of the wheel 426 when the pocket member 50 is affixed to the driven cutting wheel 426.

It is also noted that the hard inserts 30A and 30B in this embodiment comprises a generally arcuate flank surface 326A and 326B, a generally planar top rake surface 328A and 328B, and a generally planar inner flank surface 330A and 330B. The arcuate flank surfaces 326A and 328B define a generally "U" or "V" shaped profile, similar to the arcuate flank surfaces of the hard inserts 30A and 30B.

Similar to the earlier embodiments, the body 22 of the stump cutter tooth 20, as shown in FIG. 18, has one or more recesses 40A and 40B that cooperate with one or more tabs 75A and 75B formed on the pocket member 50 to provide an anti-rotation and locating feature of the invention.

It is clear that the invention provides an improved stump cutter tooth that experiences a reduction in events (e.g., the breakage or wear) that require replacement thereof. Further, the present invention provides an improved stump cutter tooth assembly (including the pocket and associated components) that experiences a reduction in events (e.g., the breakage or wear) that require replacement of the other components of the stump cutter tooth assembly including without limitation the pocket and associated fasteners. Among other things, the capability of the stump cutter tooth to provide an anti-rotation and locating feature facilitates the reduction in the breakage and/or wear of the stump cutter tooth.

Also, the invention provides an improved stump cutter tooth, as well as an assembly that uses the improved stump cutter tooth, that enhances the operational efficiencies connected with replacement of stump cutter teeth or other components of the stump cutter assembly. Among other things, the capability of the stump cutter tooth to be indexed 180 degrees so as to present a new cutting edge increases the serviceability and reduces downtime connected with the operation of the stump cutter. Further, the bi-directional capability of the different styles of pockets increases the serviceability and reduces downtime connected with the operation of the stump cutter.

The patents and publications referred to herein are hereby incorporated by reference.

Whereas particular aspects of this invention have been described above for purposes of illustration, it will be evident to those skilled in the art that numerous variations of the details of the present invention may be made without departing from the invention as defined in the appended claims.

What is claimed is:

1. A stump cutter tooth assembly, comprising:
   a pocket member including an arcuate shoulder;
   a stump cutter tooth adapted to be mounted on the pocket member, the stump cutter tooth including a tooth body having a seating surface, a planar bottom surface and an arcuate outer surface extending from the planar bottom surface; and
   at least one hard insert mounted on the seating surface of the tooth body, the at least one hard insert having a primary cutting edge at an intersection between a top surface and an outer flank surface,
   wherein the arcuate shoulder of the pocket member is adapted to abut against the arcuate outer surface of the stump cutter tooth to prevent unwanted movement of the stump cutter tooth relative to the pocket member during the cutting operation;
   wherein the stump cutter tooth is indexable.

2. The stump cutter tooth assembly according to claim 1, wherein the stump cutter tooth further comprises one or more recesses formed in the tooth body, and wherein the arcuate shoulder of the pocket member further comprises one or more tabs for cooperating with the one or more recesses to define an anti-rotation and locating feature of the stump cutter tooth assembly.

3. The stump cutter tooth assembly according to claim 1, wherein the stump cutter tooth further comprises a threaded hole capable of receiving a threaded fastener for mounting the stump cutter tooth in the pocket member.

4. The stump cutter tooth assembly according to claim 1, further comprising a pair of the hard inserts mounted on the seating surface of the tooth body.

5. The stump cutter tooth assembly according to claim 4, wherein each hard insert has a boomerang shape.

6. The stump cutter tooth assembly according to claim 4, wherein the inner flank surface of each hard insert has a planar portion and an arcuate portion.

7. A stump cutter tooth, comprising:
- a tooth body having a seating surface, a planar bottom surface and an arcuate outer surface extending from the planar bottom surface; and
- at least one hard insert having a boomerang shape mounted on the seating surface of the tooth body, the at least one hard insert having a primary cutting edge at an intersection between a top surface and an outer flank surface,
- wherein the arcuate outer surface of the stump cutter tooth is adapted to abut against an arcuate shoulder of a pocket member to prevent unwanted movement of the stump cutter tooth relative to the pocket member during the cutting operation.

8. The stump cutter tooth according to claim 7, wherein the stump cutter tooth further comprises one or more recesses formed in the tooth body for cooperating with one or more tabs formed in the pocket member to define an anti-rotation and locating feature of the stump cutter tooth assembly.

9. The stump cutter tooth according to claim 7, wherein the stump cutter tooth further comprises a threaded hole capable of receiving a threaded fastener for mounting the stump cutter tooth in a pocket member.

10. The stump cutter tooth according to claim 7, further comprising a pair of the hard inserts mounted on the seating surface of the tooth body.

11. The stump cutter tooth according to claim 10, wherein each hard insert has a boomerang shape.

12. The stump cutter tooth according to claim 10, wherein the inner flank surface of each hard insert has a planar portion and an arcuate portion.

13. The stump cutter tooth according to claim 7, wherein the stump cutter tooth is indexable.

14. A hard insert for a stump cutter tooth, comprising:
- a top surface;
- an outer flank surface;
- an inner flank surface; and
- a primary edge formed at an intersection between the top surface and the outer flank surface,
- wherein the hard insert has a boomerang shape.

15. The hard insert according to claim 14, wherein the outer flank surface of the hard insert has a substantially planar portion and an arcuate portion.

16. The hard insert according to claim 14, wherein the inner flank surface of the hard insert has a substantially planar portion and an arcuate portion.

* * * * *